United States Patent
Wutzke et al.

(10) Patent No.: US 11,938,942 B2
(45) Date of Patent: Mar. 26, 2024

(54) METHOD AND APPARATUS FOR AUTOMATING POWER TAKE-OFFS FOR VEHICLES AND EQUIPMENT

(71) Applicant: Auto Crane Company, Tulsa, OK (US)

(72) Inventors: Bryan Wutzke, Bixby, OK (US); Sam Dallas, Collinsville, OK (US); Phillip Chavez, Pompano Beach, FL (US)

(73) Assignee: Auto Crane Company, Tulsa, OK (US)

( * ) Notice: Subject to any disclaimer, the term of this patent is extended or adjusted under 35 U.S.C. 154(b) by 401 days.

(21) Appl. No.: 16/904,764

(22) Filed: Jun. 18, 2020

(65) Prior Publication Data

US 2020/0398845 A1 Dec. 24, 2020

Related U.S. Application Data

(60) Provisional application No. 62/862,922, filed on Jun. 18, 2019.

(51) Int. Cl.
*B60W 30/188* (2012.01)
*B60K 17/28* (2006.01)
(Continued)

(52) U.S. Cl.
CPC ......... *B60W 30/1888* (2013.01); *B60K 17/28* (2013.01); *B60K 25/06* (2013.01);
(Continued)

(58) Field of Classification Search
CPC ............ B60W 10/30; B60W 30/1888; B60W 2510/30; B60W 2510/0657;
(Continued)

(56) References Cited

U.S. PATENT DOCUMENTS 6,019,702 A * 2/2000 Ehrenhardt ............ B60K 17/28
477/107
6,022,292 A * 2/2000 Goodnight .............. F16H 59/14
477/121

(Continued)

FOREIGN PATENT DOCUMENTS

DE 102009029632 A1 3/2011

OTHER PUBLICATIONS

Fassi FX-Link brochure, www.fassi.com.
Fassi Drive by Fassi brochure, www.fassi.com.

*Primary Examiner* — Khoi H Tran
*Assistant Examiner* — Rodney P King
(74) *Attorney, Agent, or Firm* — GableGotwals

(57) ABSTRACT

A system and method of this disclosure control an on/off state of a power take-off by monitoring the power demand of a fluid power circuit that includes the power take-off and a piece of equipment connected to the power take-off. The power demand may be indicated by a pressure or temperature of a fluid power circuit, by a motion of the equipment or its hand-held controller, or by an engine torque of an engine driving the power take-off. When the equipment transitions between an off state and an on state, the controller automatically engages the power take-off. When the equipment is in the on-state for a predetermined amount of time and the power demand is at or below a predetermined threshold during the predetermined amount of time—thereby indicating idle time or an inactive state of the equipment—the controller automatically disengages the power take-off.

6 Claims, 5 Drawing Sheets

(51) Int. Cl.
*B60K 25/06* (2006.01)
*B60W 10/30* (2006.01)
*B66C 13/20* (2006.01)
*B66C 23/40* (2006.01)

(52) U.S. Cl.
CPC ............ *B60W 10/30* (2013.01); *B66C 13/20* (2013.01); *B66C 23/40* (2013.01); *B60Y 2200/416* (2013.01); *B66C 2700/0357* (2013.01); *B66C 2700/08* (2013.01)

(58) Field of Classification Search
CPC ......... B60W 2540/00; B60W 2300/16; B60W 2422/00; B60W 2710/021; B66C 13/20; B66C 23/40; B66C 13/40; B66C 2700/08; B66C 2700/0357; B60K 17/28; B60K 25/06; B60K 25/02; B60K 2025/026; Y02T 10/40; Y02T 10/84; B60Y 2200/416; B60Y 2300/1886
See application file for complete search history.

(56) References Cited

U.S. PATENT DOCUMENTS

| | | | |
|---|---|---|---|
| 7,310,576 B1* | 12/2007 | Letang | F02D 41/08 |
| | | | 701/112 |
| 7,954,556 B2* | 6/2011 | Hou | A01B 63/112 |
| | | | 172/3 |
| 8,256,399 B2* | 9/2012 | Gamache | F02N 11/0803 |
| | | | 123/343 |
| 8,798,827 B2 | 8/2014 | Jiang | |
| 8,798,873 B2 | 8/2014 | Cui | |
| 8,924,093 B2* | 12/2014 | Husson | B60K 25/02 |
| | | | 701/50 |
| 9,283,954 B2* | 3/2016 | Dalum | B60W 20/00 |
| 9,487,085 B2* | 11/2016 | Matsuura | B60K 17/28 |
| 10,338,272 B2* | 7/2019 | Xiang | A01B 76/00 |
| 11,124,137 B2* | 9/2021 | Trinkner | B66C 13/22 |
| 2009/0193800 A1 | 8/2009 | Peters | |
| 2012/0023921 A1 | 2/2012 | Peters et al. | |
| 2013/0000295 A1* | 1/2013 | Bissontz | B60W 10/22 |
| | | | 60/409 |
| 2019/0322461 A1* | 10/2019 | Banthia | B65G 67/24 |

* cited by examiner

METHOD AND APPARATUS FOR AUTOMATING POWER TAKE-OFFS FOR VEHICLES AND EQUIPMENT

CROSS REFERENCE TO CO-PENDING APPLICATIONS

This application claims priority to, and the benefit of, U.S. 62/862,922, filed Jun. 18, 2019.

BACKGROUND OF THE DISCLOSURE

This disclosure is in the field of systems and methods used to control a power take-off ("PTO") like those used in motorized vehicles and equipment. More particularly, the disclosure relates to a PTO control in circuit or network relation to a sensor or switch to automatically determine, based upon a power demand of the equipment as indicated by the sensor or switch, whether to engage, continue engagement, or disengage the PTO.

For the purposes of this disclosure, a PTO is a device that transfers power from a power source, such as an engine of a motorized vehicle, to a piece of equipment that does not have its own power source. The equipment may include a hydraulic or pneumatic circuit in communication with a pump driven by the PTO.

Existing PTO control systems and methods require an operator to manually activate and deactivate the PTO from a switch in a cab or a remote operator station (see U.S. Pat. No. 8,798,873 B2) of the motorized vehicle. Other systems may make use of a wireless remote control to manually active/disengage the PTO system. Operator activation and deactivation of the PTO is required even in systems where a chassis-body is configured for electronic or networked communication with a crane. See e.g. DRIVE BY FASSI (Fassi Gru S.p.A). Regardless of how the PTO is activated, when the PTO is left to run when no power is required by the equipment, fuel is wasted, excess heat and noise are generated, maintenance costs increase and the vehicle life decreases. The prior art has attempted to avoid this problem by monitoring engine speed. See e.g., U.S. Pat. No. 8,798,827 B2 to Cui. These systems still waste fuel and drive up maintenance costs because the vehicle continues to run until the operator manually turns-off the PTO or truck.

SUMMARY

In embodiments of this disclosure, a control system monitors a power demand of a piece of equipment driven by a power-take off ("PTO") of a motorized vehicle and automatically decides whether to engage, continue engagement, or disengage the PTO based upon the power demand. The PTO may be in communication with a fluid power system connected to one or more pieces of equipment. The fluid power system incorporates at least one sensor or switch whereby the control system automatically decides when to engage or disengage the PTO. The sensor or switch used may be the same sensor or switch connected to a clutch of a pump or motor providing fluid to the fluid power system. The sensor or switch may be configured to measure a pressure of the fluid power system. The sensor or switch may be configured to measure a temperature of the fluid power system. Or the sensor or switch may be configured to detect motion of the equipment or its corresponding remote command (e.g. joystick or switch). In some embodiments, the equipment is an air compressor, with the PTO control system engaging or disengaging based on demand for compressed air.

The fluid power system may be a hydraulic system. The PTO control system and method may include a controller having one or more microprocessors or their equivalents and associated software. The controller is in communication with the sensor or switch and compares a sensed value to a predetermined threshold, where when the sensed value is at or below the threshold it indicates the equipment is idle and not requiring power from the PTO.

In embodiments, a control system and method—configured for automatic control of a power take-off connected to an engine of a motor vehicle and a fluid power circuit of at least one piece of equipment—includes a sensor or switch arranged to monitor the power demand of the fluid power circuit; and a controller including a microprocessor and associated software in circuit communication with the sensor or switch and the power take-off; wherein when the at least one piece of equipment transitions between an off state and an on state, the controller automatically engages the power take-off; and wherein when the at least one piece of equipment is in the on-state for a predetermined amount of time and a sensed reading of the fluid power circuit is at or below a predetermined threshold during the predetermined amount of time, the controller automatically disengages the power take-off.

In some embodiments of the control system and method, the sensor or switch may be arranged to detect or monitor motion of the equipment or the motion of a remote control configured to control the piece of equipment.

In embodiments, the PTO control system is configured to determine whether to automatically turn-on/off the PTO by singularly querying an input such as pressure (air or hydraulic), temperature, remote command (switch or joystick), remote accelerometer (detect movement), or engine torque and comparing it to a threshold value or range. For purposes of this disclosure, "remote command" means a wireless or wired hand-held remote control configured to control the piece of equipment. "Remote accelerometer" means a sensor connected to the piece of equipment and configured to detect motion of the piece of equipment. that could be wireless or wired. In some embodiments, two or more inputs may be queried or considered and compared to their respective threshold values or ranges.

DETAILED DESCRIPTION

Figure 1:
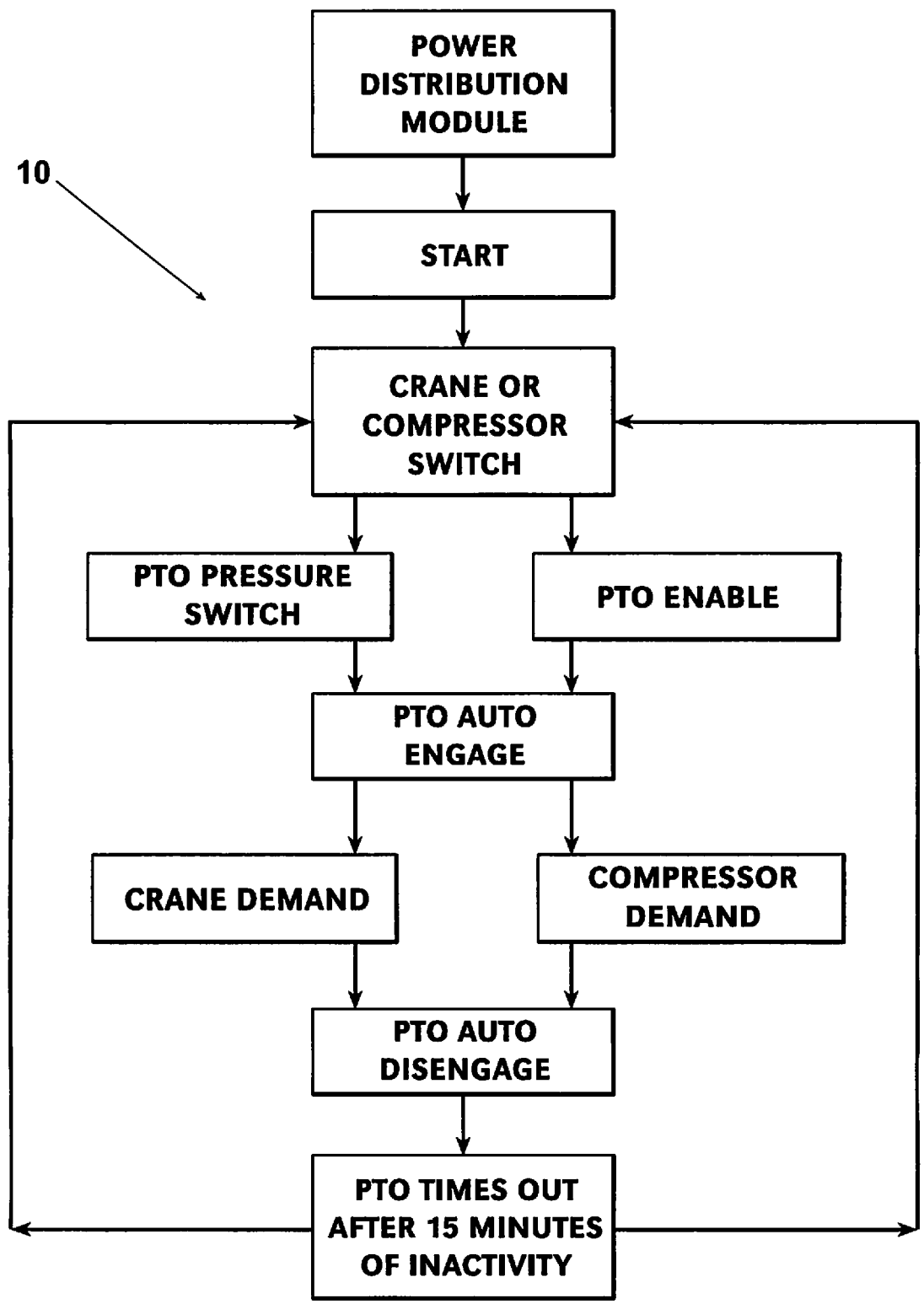
FIG. 1 is a flow chart of an embodiment of an automatic on/off system for a power take-off ("PTO"). The PTO may time out after a predetermined amount of inactive time. By way of a non-limiting example, the predetermined amount of inactive time may be 15 minutes.
Figure 2:
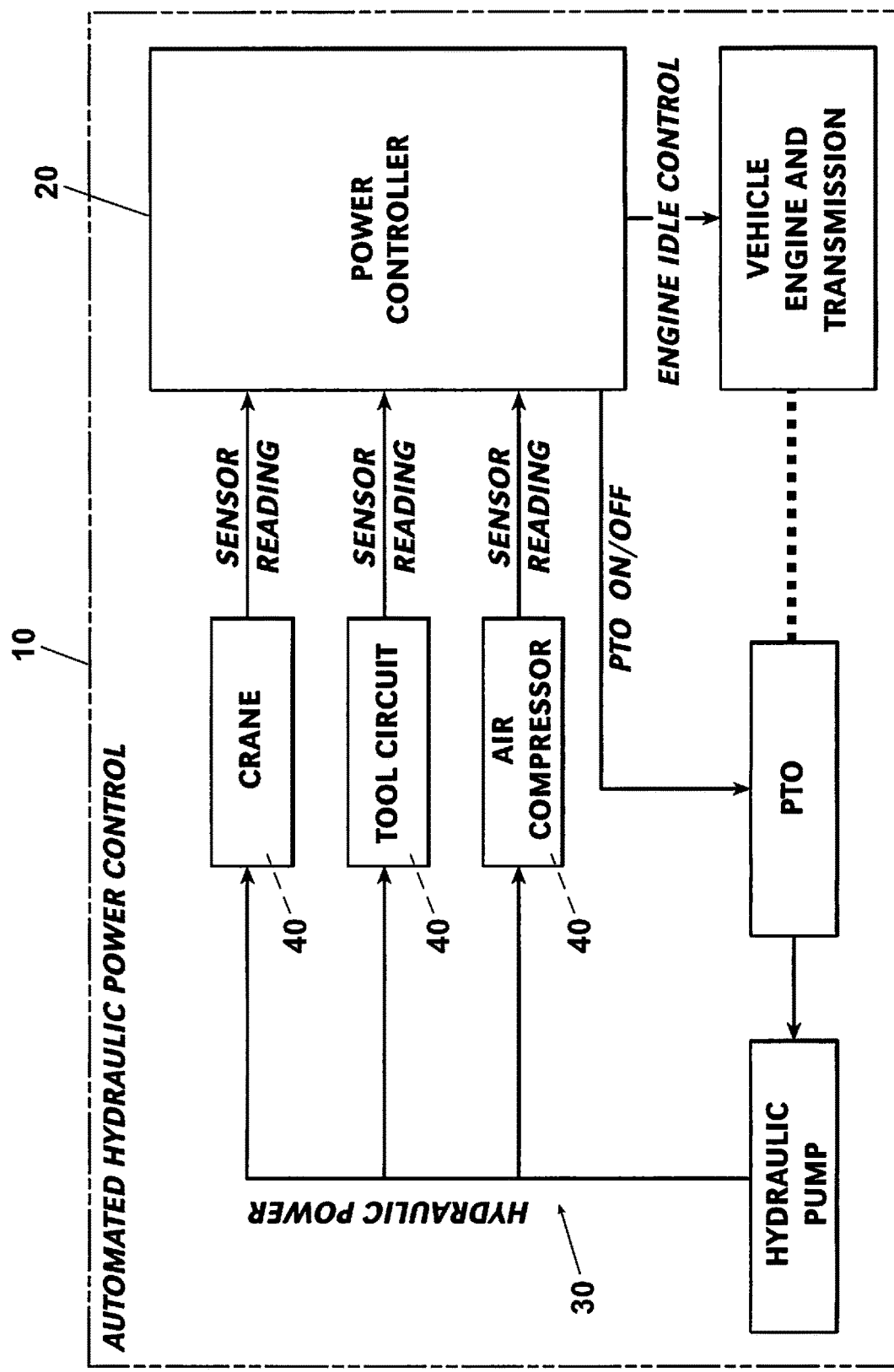
FIG. 2 is a schematic illustrating an embodiment of a PTO on/off system of FIG. 1 in circuit relationship to a hydraulic pump providing fluid to equipment including a crane, outrigger, and air compressor. In embodiments, a pressure sensor or switch may be included in the fluid circuit and connected to the PTO control.
Figure 3:
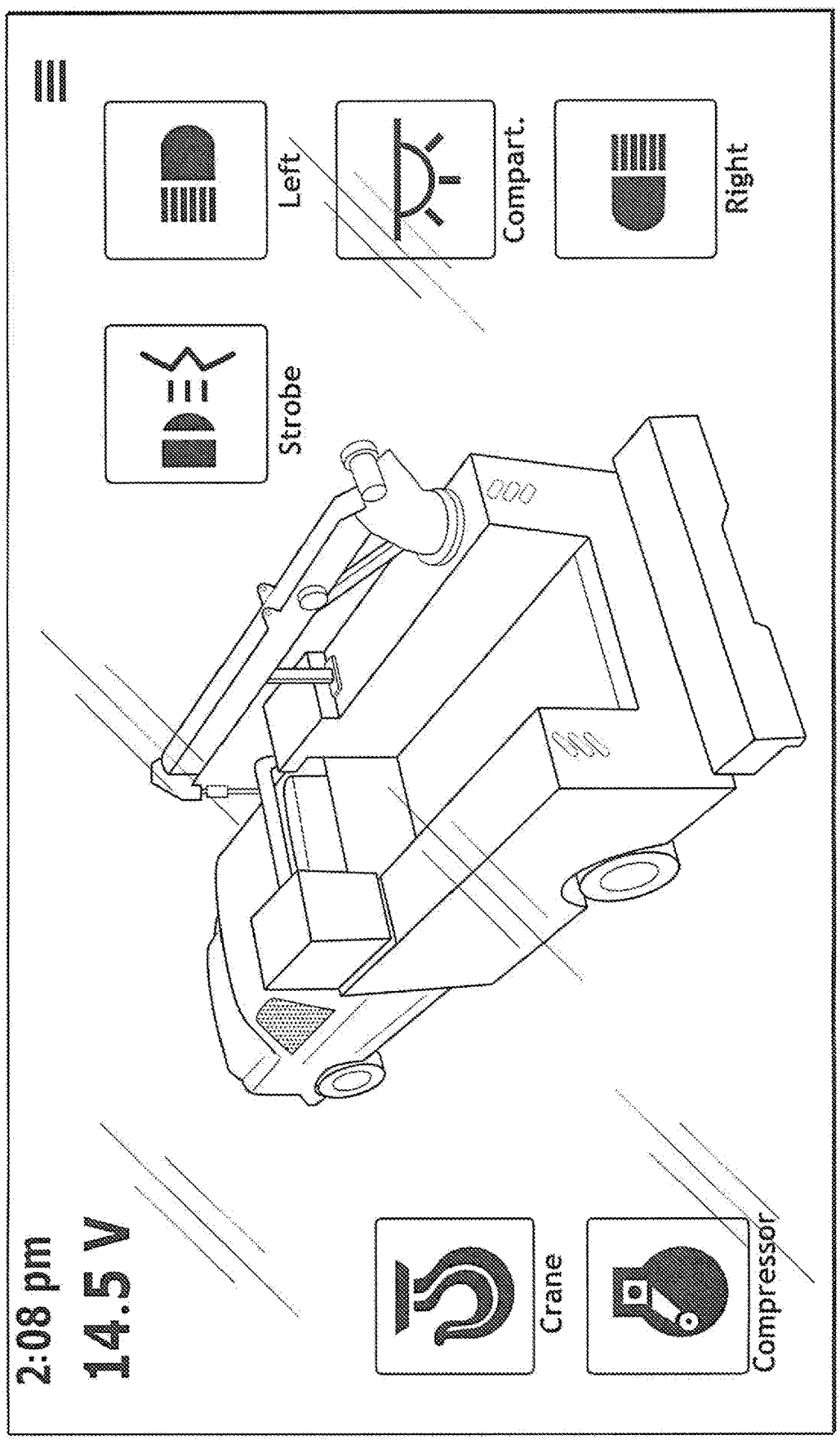
FIG. 3 is an embodiment of a graphical user interface of this disclosure.
Figure 4:
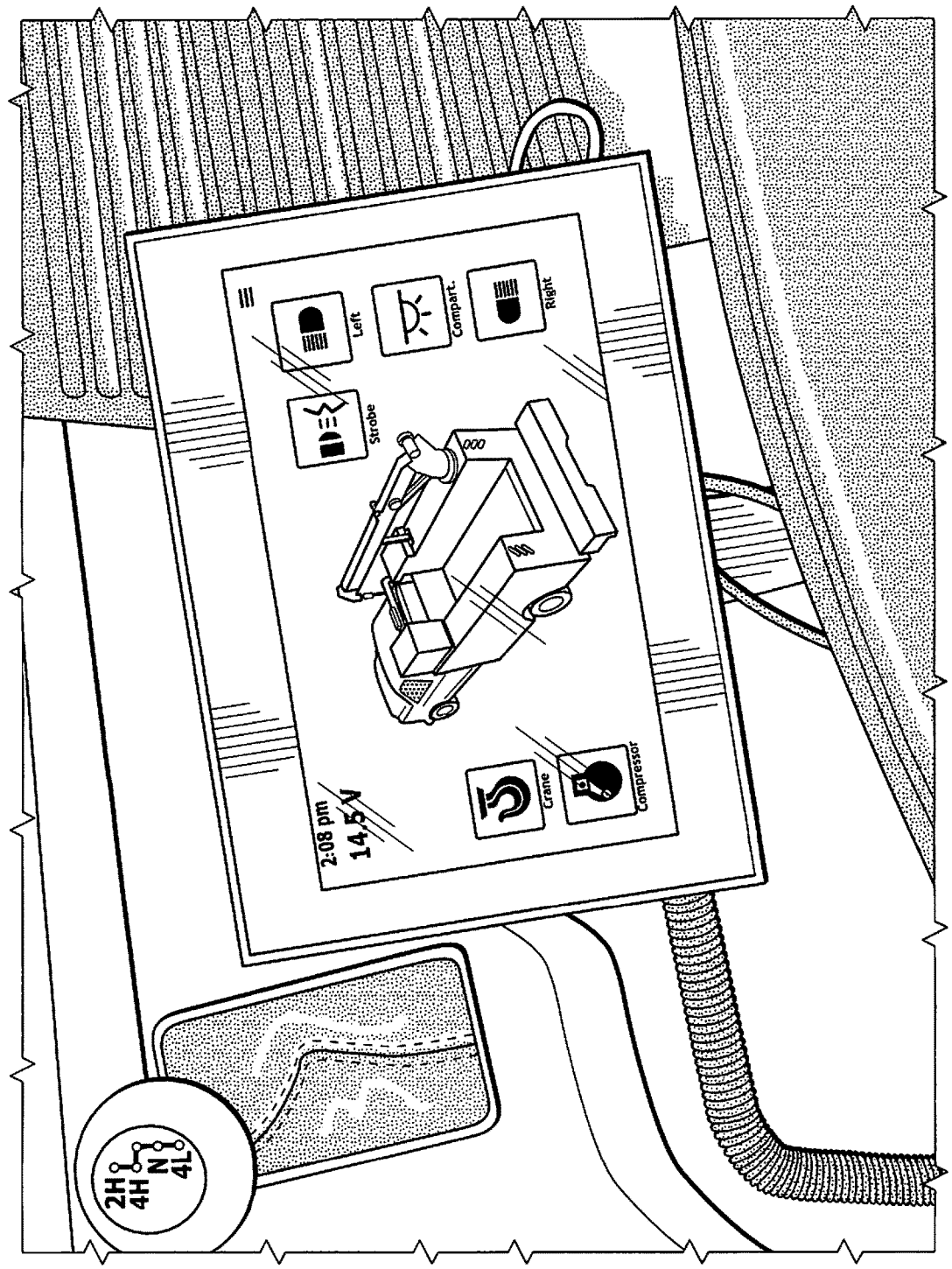
FIG. 4 is another view of the graphical user interface of FIG. 3 located in a cab of the motor vehicle. The graphical user interface may also be located outside of the cab.
Figure 5:
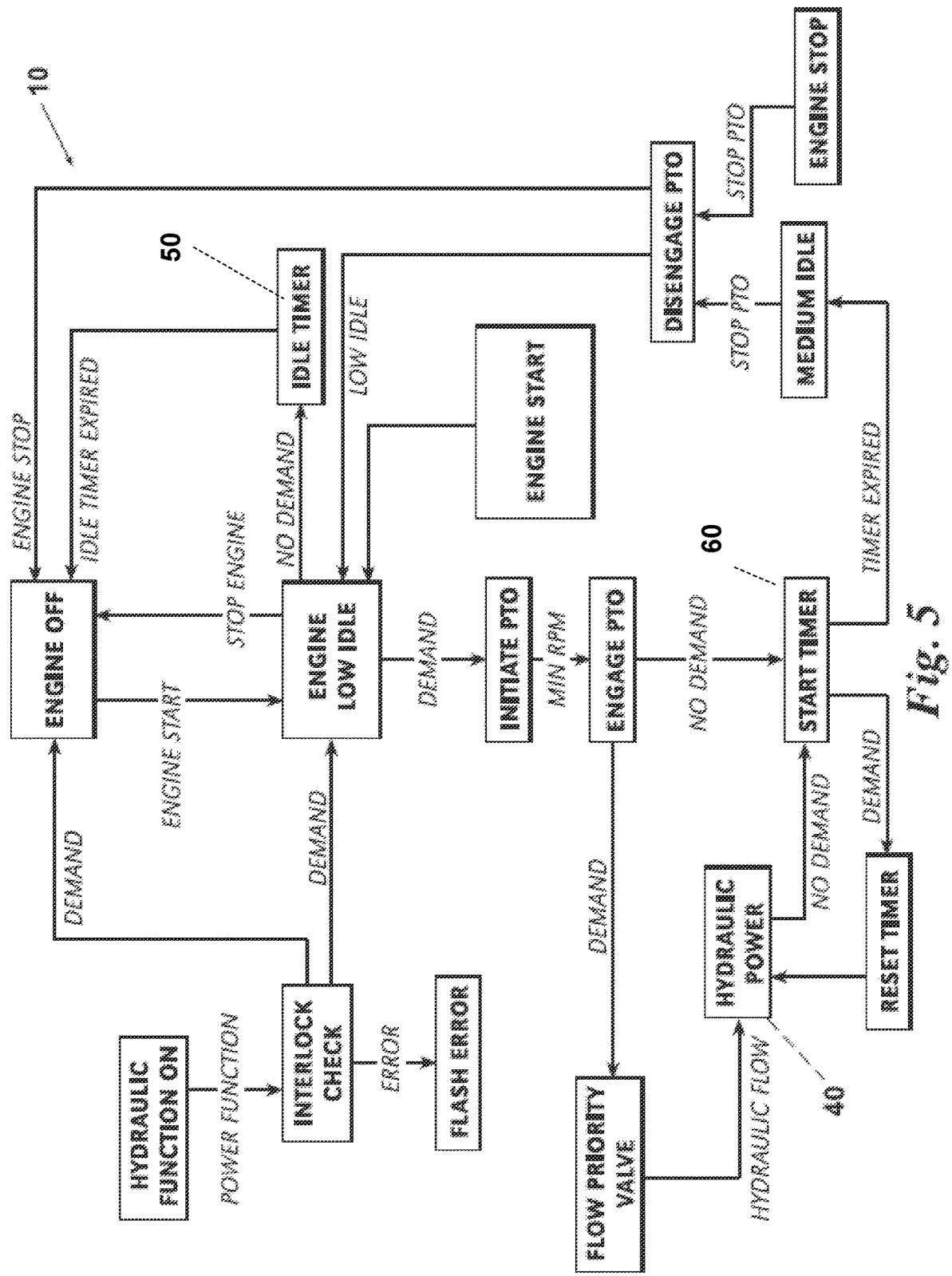
FIG. 5 is a state diagram of an embodiment of a control system and method of this disclosure. The power demand of the equipment, which may be indicated by hydraulic power or pneumatic power, may be monitored by a sensor or switch configured to detect pressure or temperature of the fluid circuit. In some embodiments, the power demand may be monitored by a sensor or switch configured to detect motion of the equipment or its remote command, or may be configured to detect engine torque.

Referring to the drawings, embodiments of a system and method 10 of this disclosure are configured for control of a power take-off ("PTO") connected to an engine of a motor vehicle and at least one piece of equipment. The system and method 10 includes a sensor or switch 40 arranged to directly or indirectly monitor a power demand of the piece of equipment and a controller 20 including a microprocessor and associated software in circuit communication with the sensor or switch 40 and the PTO. The sensor or switch 40 may be configured to detect pressure or temperature of a fluid circuit 30, a motion of the equipment or a remote command associated with the equipment, or engine torque of the motor vehicle engine connected to the PTO.

In embodiments, the PTO control system and method 10 queries only one sensed input to decide whether to disengage the PTO. Engine speed is not monitored. When the at least one piece of equipment transitions between an off state and an on state, the controller 20 automatically engages the power take-off and when the at least one piece of equipment is in the on-state for a predetermined amount of time and power demand as sensed by the sensor 40 is at or below a predetermined threshold during the predetermined amount of time, the controller 20 automatically disengages the power take-off. The system and method 10 may continue engagement as the power demand remains above the predetermined threshold. The at least one piece of equipment may be an air compressor. In other embodiments, the equipment is a crane.

Some embodiments of this disclosure include a PTO control system and method 10 that senses a pressure of a fluid power system 30 connected to a piece of equipment initially enabled by an operator and, based upon the sensed pressure, automatically engages and disengages the PTO. The fluid power system 30 may be a hydraulic system or a pneumatic system. The control system and method 10 may disengage the PTO after the sensed pressure remains below a threshold pressure indicative of no demand or no load on the piece of equipment or fluid power system 30 for a predetermined amount of time. In some embodiments, the equipment may include a crane and an air compressor and PTO engagement and disengagement may be a function of demand for compressed air. Regardless of the equipment, the automatic engagement and disengagement allows the engine to idle-down or stop, thereby saving fuel and reducing noise and heat of the fluid power system 30.

By way of a non-limiting example, a motorized vehicle may include a PTO in communication with a hydraulic pump or motor providing hydraulic fluid to a crane, tool circuit, and an air compressor. Each fluid line may include a pressure sensor or switch to monitor a fluid pressure. The fluid pressure may be proportionate to a load on the equipment, with a predetermined pressure indicative of no load on a respective piece of equipment. A PTO control 20 of this disclosure may reside between the vehicle power control and the PTO and includes a microprocessor with associated software.

The PTO control 20 may also include a graphical user interface located in a cab of the motor vehicle, on or in a work box or cabinet of the motor vehicle, or both in the cab and the cabinet. The user interface may also provide on-off control of the crane, tool circuit, and air compressor.

One of the pressure sensors or switches 40 used by the PTO control 20 may be the same sensor or switch connected to a clutch of the pump or motor providing the hydraulic fluid. An operator may manually or remotely engage the crane or compressor switch, thereby enabling the PTO. The control system and method 10 automatically engages the PTO and then monitors, for example, crane demand and compressor demand to decide when to disengage the PTO. In some embodiments, the PTO may time out after a predetermined amount of inactive time. One timer 60 (first timer) will start once power demand from the crane or air compressor is no longer detected and, therefore, measures the inactive time. Inactive time is a period of time when, for example, a pressure of the fluid power circuit 30 is at or below a predetermined pressure, thereby indicating inactivity of the equipment. The amount of inactive time may be any time preferable or suitable, for example, 5 minutes, 10 minutes, 15 minutes. Once the PTO has been disengaged, another timer 50 (second timer) begins and the controller will shut the engine off after a predetermined amount of time.

Other embodiments of this disclosure include a PTO control system and method 10 that senses motion of a remote command such as a switch or joystick connected to a piece of equipment initially enabled by an operator and, based upon the sensed motion of the remote command, automatically engages and disengages the PTO. When the at least one piece of equipment transitions between an off state and an on state, the controller 20 automatically engages the power take-off and when the at least one piece of equipment is in the on-state for a predetermined amount of time and the remote command or equipment is idle during the predetermined amount of time (i.e, not moving), the controller 20 automatically disengages the PTO. Inactive time is a period of time when the status of the remote command is idle, thereby indicating inactivity of the equipment. The amount of inactive time may be any time preferable or suitable, for example, 5 minutes, 10 minutes, 15 minutes.

Another embodiment of this disclosure includes a PTO control system and method 10 that senses velocity or acceleration of a piece of equipment initially enabled by an operator and, based upon the sensed velocity or acceleration, automatically engages and disengages the PTO. The system may include a sensor 40 such as an accelerometer arranged to monitor movement of the at least one piece of equipment. When the at least one piece of equipment transitions between an off state and an on state, the microprocessor automatically engages the PTO and when the at least one piece of equipment is in the on-state for a predetermined amount of time and movement is at or below a predetermined velocity or acceleration during the predetermined amount of time, the microprocessor automatically disengages the PTO. Inactive time is a period of time when the velocity or acceleration is at or below a predetermined threshold, thereby indicating inactivity of the equipment. The amount of inactive time may be any time preferable or suitable, for example, 5 minutes, 10 minutes, 15 minutes.

In still other embodiments, the PTO control system and method 10 may be configured to determine whether to automatically turn-on/off the PTO on the basis of engine torque. The system and method 10 may include a sensor 40 arranged to monitor torque of an engine associated with the at least one piece of equipment. When the at least one piece of equipment transitions between an off state and an on state, the controller 20 automatically engages the PTO and when the at least one piece of equipment is in the on-state for a predetermined amount of time and engine torque is at or below a predetermined velocity or acceleration during the predetermined amount of time, the controller automatically disengages the power take-off. Inactive time is a period of time when the engine torque is at or below a predetermined threshold, thereby indicating inactivity of the equipment. The amount of inactive time may be any time preferable or suitable, for example, 5 minutes, 10 minutes, 15 minutes.

While embodiments of a PTO control system and method have been described, modifications may be made by persons of ordinary skill in the field without departing from the scope of the following claims. The elements recited in the claims are entitled to their full range of equivalents.

The invention claimed is:

1. A system adapted for control of a power take-off connected to an engine of a motor vehicle and to a fluid power circuit including a crane and an air compressor mounted on the motor vehicle, the system comprising:
   a first and a second timer;
   a sensor arranged to monitor a power demand on the fluid power circuit;
   a controller including a microprocessor and associated software in circuit communication with the first and second timers, the sensor, the power take-off and the engine;
   wherein when the engine is at idle rpm and at least one of the crane and the air compressor transitions from an off state to an on state, the controller automatically engages the power take-off and increases engine rpm above the idle rpm; and
   wherein when the at least one of the crane and the air compressor is in the on-state and the power demand on the fluid power circuit as indicated by the sensor is at or below a predetermined threshold, the first timer is started and the controller maintains engagement of the power take-off and the increased engine rpm; and
   wherein when the at least one of the crane and the air compressor is in the on-state for a predetermined amount of time as indicated by the first timer and the power demand on the fluid power circuit as indicated by the sensor is at or below the predetermined threshold during the predetermined amount of time, the controller automatically disengages the power take-off and resets the first timer, decreases the engine rpm, and sets the second timer; and
   wherein, when the power take-off is disengaged for a predetermined amount of time as indicated by the second timer, the controller shuts off the engine and resets the second timer; and
   wherein the at or below the predetermined threshold indicates no load on the at least one of the crane and the air compressor, and
   wherein above the predetermined threshold indicates a power demand on the fluid power circuit because of a load on the at least one of the crane and the air compressor.

2. The system of claim 1, wherein the sensor is configured to sense a fluid pressure, a fluid temperature, or the fluid pressure and temperature of the fluid power circuit.

3. The system of claim 1, wherein the sensor is configured as a switch.

4. A method for automatically engaging and disengaging a power take-off connected to an engine of a motor vehicle and a crane and an air compressor mounted on the motor vehicle, the power take-off in communication with a sensor arranged to monitor a fluid power circuit including the crane and the air compressor, and a controller including a microprocessor and associated software in circuit communication with the sensor, a first and a second timer, the power take-off and the engine, the method executed by the controller and comprising:
   monitoring a power demand of the fluid power circuit as indicated by the sensor;
   automatically engaging the power take-off and increasing engine rpm above idle rpm when the engine is at the idle rpm and at least one of the crane and the air compressor transitions between an off state and an on state;
   starting the first timer when the at least one of the crane and the air compressor is in the on-state and the power demand on the fluid power circuit as indicated by the sensor is at or below a predetermined threshold, the controller continuing to maintain engagement of the power take-off and the increased engine rpm;
   automatically disengaging the power take-off, resetting the first timer, decreasing engine rpm, and setting the second timer when the at least one of the crane and the air compressor is in the on-state for a predetermined amount of time as indicated by the first timer and the power demand on the fluid power circuit as indicated by the sensor is at or below a predetermined threshold during the predetermined amount of time; and
   shutting off the engine and resetting the second timer when the power take-off is disengaged for a predetermined amount of time as indicated by the second timer;
   wherein the at or below the predetermined threshold indicates no load on the at least one of the crane and the air compressor, and
   wherein above the predetermined threshold indicates a power demand on the fluid power circuit because of a load on the at least one of the crane and the air compressor.

5. The method of claim 4, wherein the sensor is configured to sense a fluid pressure, a fluid temperature, or the fluid pressure and temperature of the fluid power circuit.

6. The method of claim 4, wherein the sensor is configured as a switch.

* * * * *